US009613101B2

(12) United States Patent
Granström

(10) Patent No.: US 9,613,101 B2
(45) Date of Patent: Apr. 4, 2017

(54) PROMOTING AN ORIGINAL VERSION OF A COPYRIGHTED MEDIA ITEM OVER AN AUTHORIZED COPIED VERSION OF THE COPYRIGHTED MEDIA ITEM IN A SEARCH QUERY

(71) Applicant: Google Inc., Mountain View, CA (US)

(72) Inventor: Johan Georg Granström, Zürich (CH)

(73) Assignee: Google Inc., Mountain View, CA (US)

( * ) Notice: Subject to any disclaimer, the term of this patent is extended or adjusted under 35 U.S.C. 154(b) by 474 days.

(21) Appl. No.: 13/839,062

(22) Filed: Mar. 15, 2013

(65) Prior Publication Data

US 2014/0280111 A1    Sep. 18, 2014

(51) Int. Cl.
*G06F 17/30* (2006.01)
*G06Q 30/02* (2012.01)

(52) U.S. Cl.
CPC .... *G06F 17/3053* (2013.01); *G06F 17/30991* (2013.01); *G06Q 30/0256* (2013.01); *G06F 17/30023* (2013.01)

(58) Field of Classification Search
CPC ............. G06F 17/30825; G06F 21/10; G06F 17/30023; G06F 17/30; G06F 17/3053; G06F 17/3005; G06F 17/30058; G06F 17/30867; G06F 17/30554; G06F 17/30991; H04N 21/23418; H04N 21/8358
See application file for complete search history.

(56) References Cited

U.S. PATENT DOCUMENTS

| 8,094,872 B1 | 1/2012 | Yagnik et al. | |
| 9,213,687 B2 * | 12/2015 | Au | G06F 17/27 |
| 9,213,745 B1 * | 12/2015 | Benitez | G06F 17/3053 |
| 2005/0010530 A1 * | 1/2005 | Kakutani | G06F 21/10 705/57 |
| 2006/0242554 A1 * | 10/2006 | Gerace | G06F 17/30867 715/209 |
| 2007/0250901 A1 * | 10/2007 | McIntire | H04N 7/17318 725/146 |

(Continued)

FOREIGN PATENT DOCUMENTS

WO    2009073895    6/2009

OTHER PUBLICATIONS

"Real-Time Near-Duplicate Elimination for Web Video Search With Content and context", Xiao Wu, Alexander G. Hauptmann and Hung-Khoon Tan, 2009, pp. 196-207.*

(Continued)

*Primary Examiner* — Merilyn Nguyen
(74) *Attorney, Agent, or Firm* — Fenwick & West LLP

(57) ABSTRACT

Systems and methods promoting an authoritative version (AVR) of copyrighted media content over one or more non-authoritative versions of the copyrighted media content relative to relevancy of the copyrighted media content to a search query are presented. An example system includes a matching component configured to identify copyrighted media content included in a video and a promoting component configured to promote in connection with a search query an authoritative version of the copyrighted media content over one or more non-authoritative versions of the copyrighted media content relative to relevancy of the copyrighted media content to the search query.

17 Claims, 8 Drawing Sheets

(56) References Cited

U.S. PATENT DOCUMENTS

| | | | |
|---|---|---|---|
| 2008/0172445 A1* | 7/2008 | Zaidelson | G06Q 10/10 |
| | | | 709/201 |
| 2012/0117130 A1* | 5/2012 | Gearhart | G06F 17/30023 |
| | | | 707/827 |
| 2012/0117659 A1* | 5/2012 | Gearhart | G06F 21/10 |
| | | | 726/27 |
| 2012/0136853 A1* | 5/2012 | Kennedy | G06F 17/30038 |
| | | | 707/723 |
| 2012/0143915 A1 | 6/2012 | Gupta et al. | |
| 2012/0309515 A1* | 12/2012 | Chung | H04N 21/274 |
| | | | 463/31 |
| 2013/0103592 A1* | 4/2013 | Shenk et al. | 705/80 |
| 2014/0164507 A1* | 6/2014 | Tesch | H04L 51/10 |
| | | | 709/204 |

OTHER PUBLICATIONS

International Search Report and Written Opinion for PCT Application Serial No. PCT/US2014/027482, dated Aug. 18, 2014, 11 pages.

* cited by examiner

PROMOTING AN ORIGINAL VERSION OF A COPYRIGHTED MEDIA ITEM OVER AN AUTHORIZED COPIED VERSION OF THE COPYRIGHTED MEDIA ITEM IN A SEARCH QUERY

TECHNICAL FIELD

This application generally relates to promoting an original version of a copyrighted media item over an authorized copied version of the copyrighted media item in connection with a search query.

BACKGROUND

Various media sharing mediums (e.g., media sharing websites) allow users to create, upload, view and share videos. Often times, these videos include original content of a creator. However, some users may create and upload videos comprised entirely or partially of copyrighted content. In some aspects, owners of copyrighted media content may desire to catch video creators that unlawfully used their copyrighted media content (in a video) and prevent such unlawful use by blocking publication of the video(s). In other instances, owners of the copyrighted media content may allow certain user videos that include their copyrighted media content to be published without objection, usually in exchange for some form of reward/benefit. However, as the number of user videos employing copyrighted media content of an original media item increase, a user may have a difficult time finding the original media amongst a sea of copies using a standard search engine.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
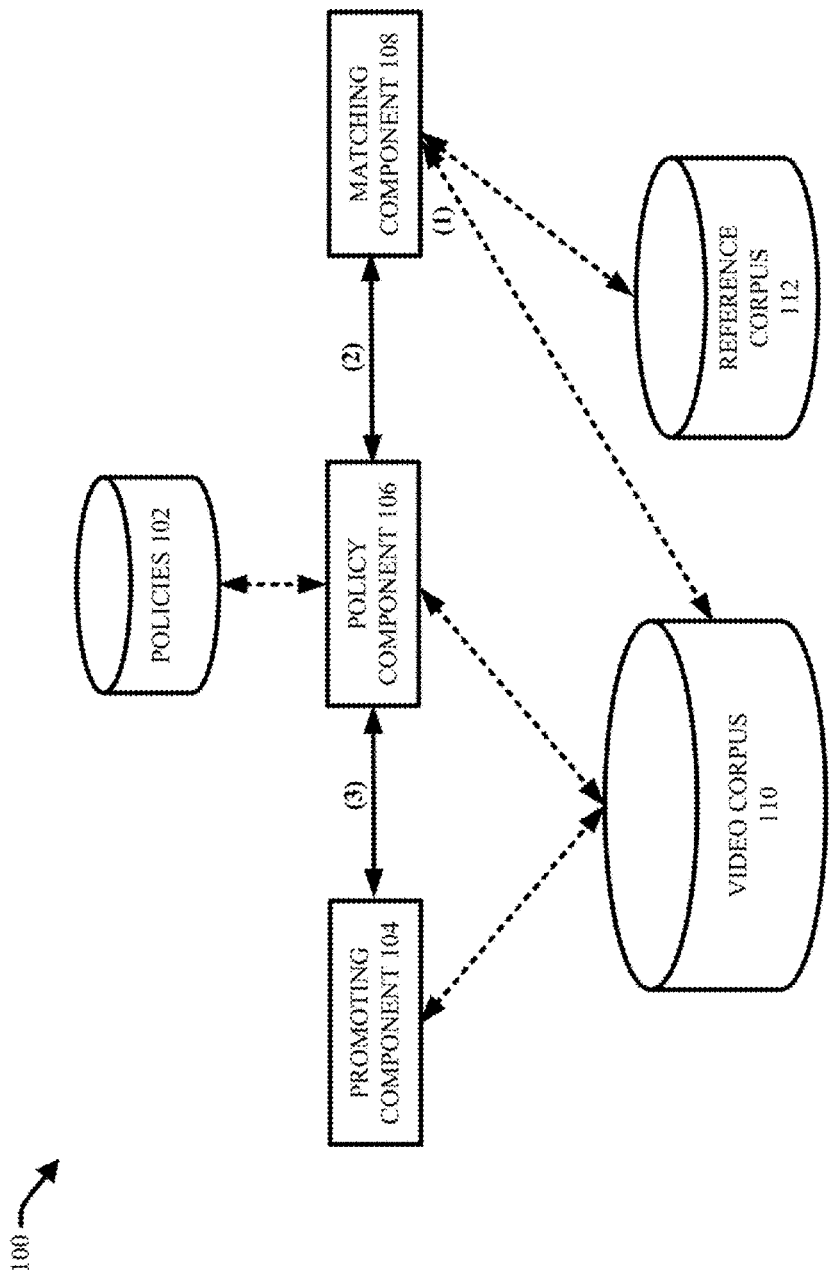
FIG. 1 illustrates a system for identifying copyrighted content in user videos, identifying policies associated with usage of the copyrighted content in the user videos and determining search signals for the videos as a function of the associated policies, in accordance with various aspects and embodiments described herein.

The innovation(s) are described with reference to the drawings, wherein like reference numerals are used to refer to like elements throughout. In the following description, for purposes of explanation, numerous specific details are set forth in order to provide a thorough understanding of the innovation(s). It may be evident, however, that the innovation(s) can be practiced without these specific details. In other instances, well-known structures and components are shown in block diagram form in order to facilitate describing the innovation.

By way of introduction, the subject matter described in this disclosure relates to systems and methods for ranking, ordering or promoting videos (e.g., relative to a given search query) based in part on policies governing usage of copyrighted content included in the videos and promoting original versions of copyrighted content over videos including non-authoritative versions of the copyrighted content with respect to relevancy of the copyrighted content to a search query. An example system includes a matching component configured to identify copyrighted media content included in a video, wherein the copyrighted media content is associated with a publication policy. The system further includes a verification component configured to verify copyright authorization associated with inclusion of the copyrighted media content in the video, and a promoting component configured to determine relative ranking for the video with respect to a given search query based on publication policy, copyright authorization, and availability of an authoritative version of the copyrighted content.

In an aspect, the promoting component determines relative ranking based on degree of similarity between the user video and an original copyrighted media item represented by the copyrighted media content. The degree of similarity can be determined based on various factors, such as amount of copyrighted content employed as compared to other content in the user video and/or features of the copyrighted media item (e.g., copyrighted media item includes a video component, an audio component, or video+audio, encoding quality, language of audio component, etc.) as compared to features of the other media content. By assigning a higher relative ranking to an original copyrighted media item over a user video including a subset of the copyrighted media content, the original copyrighted media item can be promoted ahead of the user video in connection with a search result.

Example Systems for Promoting an Original Version of a Copyrighted Media Item Over an Authorized Copied Version of the Copyrighted Media Item in a Search Query Referring now to the drawings, with reference initially to FIG. 1, presented is a diagram of system 100 for promoting an original version of a copyrighted media item (e.g., authoritative version) over an authorized version of the copyrighted media item (non-authoritative version) in connection with relevancy thereof to a search query. Various media sharing mediums (e.g., media sharing websites) allow users to create, upload, view and share videos. Often times, these videos include original copyrighted content. However, some users may create and upload videos comprised entirely or partially of copies of the copyrighted media content. As used herein the term copyright refers a legal concept giving a creator of an original work exclusive rights to it. In accordance with an aspect, embodiments disclosed herein facilitate relative ordering of authoritative versions of original work(s) over non-authoritative versions (e.g., complete or partial copies) as a function of relevancy of the original work(s) to particular search queries.

In some aspects, owners of a copyrighted media item may desire to catch video creators that unlawfully use copyrighted content of the media item in a user video and prevent such unlawful use thereof by blocking publication of the user video. However in other instances, owners of the copyrighted media item may allow user videos including copyrighted media content of the media item to be published without objection, usually in exchange for some form of reward/benefit. As used herein, an original version of a copyrighted media item is referred to as the authoritative version reference (AVR) of the copyrighted media item. A user video including copyrighted media content of an original copyrighted media item (e.g., including copyrighted content of the AVR) is referred to as a user video version or copy of the copyrighted media item.

System 100 (and additional systems described herein) is configured to rank, order or promote (relative to a search query) videos, based on search signals associated with versions of a copyrighted media item with respect to an authoritative version of the copyrighted media item, and employ the search signals to promote the authoritative version over the non-authoritative versions (e.g., user versions) in connection with the respective search query. For example, when a user searches for a video amongst a corpus of videos using a keyword search, a search engine will apply one or more algorithms that generates a list of possible candidates that fulfill the search criteria with respect to various parameters (e.g., number of keywords included in title, number of keywords in description, channel association, comments associated with a video, user history views, user preferences and etc.). According to this example, a search result could appear with the following structure: X C1 X C2 X X X X X R X X C3 X, where R represents an AVR of a video, C1, C2, and C3 represent respective versions of R (e.g., user generated copies/versions of R), and X represents a place holder of other videos not related to R, C1, C2 or C3.

In terms of the above example, system 100 (and additional systems described herein), is configured to associate search signals with R, C1, C2, and C3 that influence the order in which R, C1, C2, and C3 appear in a search result. More specifically, system 100 can associate search signals with R, C1, C2, and C3 that result in promotion of R over C1, C2, and C3 in a given search result. For example, with the promoting or ordering aspects of system 100, a search engine may modify the search result to appear with a structure resembling X C1 R X X X X C2 X X X X X C3 or X R X X X X X C1 X C2 X X C3 X. Placement of R, C1, C2 and C3 with respect to one another will be based at least in part on the search signals associated therewith.

For example, C1, C2, C3, and R could respectively be associated with a first, second, third and fourth search scores where the first score is higher than the second, the second score is higher than the third, etc. According to this example, a search algorithm can be configured to promote higher scored videos before lower scored videos. The scores associated with R, C1, C2 and C3 that control the placement/order of R, C1, C2, and C3 with respect to one another and other videos (at places X) included in a result can be a function of various criteria included in the search algorithm (e.g., number of keywords included in title, number of keywords in description, channel association, comments associated with a video, user history views, user preferences and etc.). In an aspect, in order to promote R over C1, C2, and C3 an authoritative video promotion search algorithm can increase the score associated with R relative to the importance of the copyrighted content of R to the search query. For instance, the algorithm can cause the score associated with R to be higher than the score associated with C3 and C2. Accordingly, this technique facilitates authoritative versions to be relatively ordered higher than non-authoritative versions (e.g., user videos that are direct or partial copies) for a given search query as a function of relevancy of the content of the copyrighted work to the respective search query.

It is to be appreciated however that if other portions or aspects of user videos (e.g., not related to the copyrighted content) are more relevant than the copyrighted content employed in the user videos with respect to a given search query, the most relevant videos will be ordered higher for the particular query. This is because relevancy of content will be weighted more with respect to a search query than whether other content (less relevant to the search query) is authoritative or not. Thus, disclosed aspects facilitate promoting authoritative work(s) over corresponding non-authoritative work(s) in connection with relative relevancy of the authoritative work(s) to a particular search query.

In order to facilitate promoting authoritative versions of media items, system 100 is configured to identify user videos that include copyrighted content of an AVR of a media item and analyze policies governing usage of the copyrighted content. System 100 can further associate search signals with user videos employing copyrighted content of an AVR based in part on policies governing usage of the copyrighted content as well as other factors (e.g., similarity of the version/copy to the AVR, quality of the version/copy, reputation of the creator of the version/copy, etc.).

In an aspect, system 100 is configured to automatically identify copyrighted media content included in a user video. In particular, system 100 can include a reference database 112 that stores reference files of authoritative/original versions copyrighted media content (e.g., copyrighted audio media components and/or copyrighted video media components). The reference files can be provided by the copyright owners of the media content. When a user video is uploaded to a media sharing system, the uploaded video can be vetted for inclusion of copyrighted content. For example, video corpus 110 can include a database of uploaded user videos. As marked by number (1), reference matching component 108 can compare an uploaded user video in video corpus 110 to reference files in the reference database and identify matches between the reference files and an uploaded user video. For example, a user video could include content that matches one or more reference files.

As marked by number (2), if the matching component 108 identifies a match, system 100 can employ policy component 106 to identify and analyze policies that govern publication of a user video that includes the copyrighted content. For example, in association with reference files of copyrighted content, an owner of the copyrighted content can define, in advance, policies for policing usage of the copyrighted content in association with publication (e.g., at a video sharing website) of a user video that includes the copyrighted content. The policies can be associated with the reference files and/or provided in policy database 102. For example, an owner of copyrighted media content may define a policy that allows users to publish/share a user video that includes their copyrighted media content in exchange for a fee. In another example, an owner of copyrighted content may define a policy that allows users to publish/share a user video that includes the copyrighted media content in exchanged for monitored statistical information associated with consumption of the video at a video sharing website. In another example, an owner of copyrighted content may define a policy that allows users to publish/share a user video that includes their copyrighted media content in exchanged for associating the user video with a public service message or advertisement. Still, in yet another aspect, an owner of copyrighted content may choose to block publication of a video that includes their copyrighted media content.

Continuing with number (3), promoting component 104 is configured to associate search signals with user uploaded videos included in video corpus 110 as a function of copyrighted content included in the user uploaded videos and policies (as defined in policies database 102) associated with the copyrighted content. The search signals associated with the user uploaded videos can further affect how and whether a user video is rendered in results for a search query. For example, if a user video includes copyrighted content and the policy associated with the copyrighted content prevents publication/sharing of the copyrighted content, the promoting component 104 can associate search signals with the user video that results in blocking or preventing the user video from appearing in a search result.

In another aspect, the search signals can result in promotion of an AVR of a video with respect to user generated versions/copies of the AVR (e.g., by causing the AVR to appear more frequently and/or higher on a list of a search results as compared to a user generated versions/copies) that have been authorized to employ the copyrighted media content of the AVR based on a policy (defined by the copyright owner), governing usage of the copyrighted media content of the AVR. For example, in exchange for allowing a video creator to publish a video that includes copyrighted media content of an AVR of a media item, the owner of the copyrighted media content can require the video creator to pay a fee. If the video creator complies and pays the fee, the promoting component 104 can associate a search signal with the video that indicates the video has an AVR associated therewith. In some aspects, the search signal can also reflect additional information related to the copyrighted content of the user video (e.g., policy associated with usage, degree of similarity to the AVR, manner of incorporation of the copyrighted content, and etc.). The search signal can further be employed by the promoting component 104 (or other search engine/algorithm) when ordering the user video with respect to its associated AVR in a search query. In this way, the manner in which user videos that have been authorized to employ copyrighted media content (e.g., versions of an AVR of a media item) appear in a search result is regulated such that the versions/copies of the AVR are not promoted ahead of the AVR in consideration of the relevancy of the copyrighted media content for a given search query.

Figure 2:
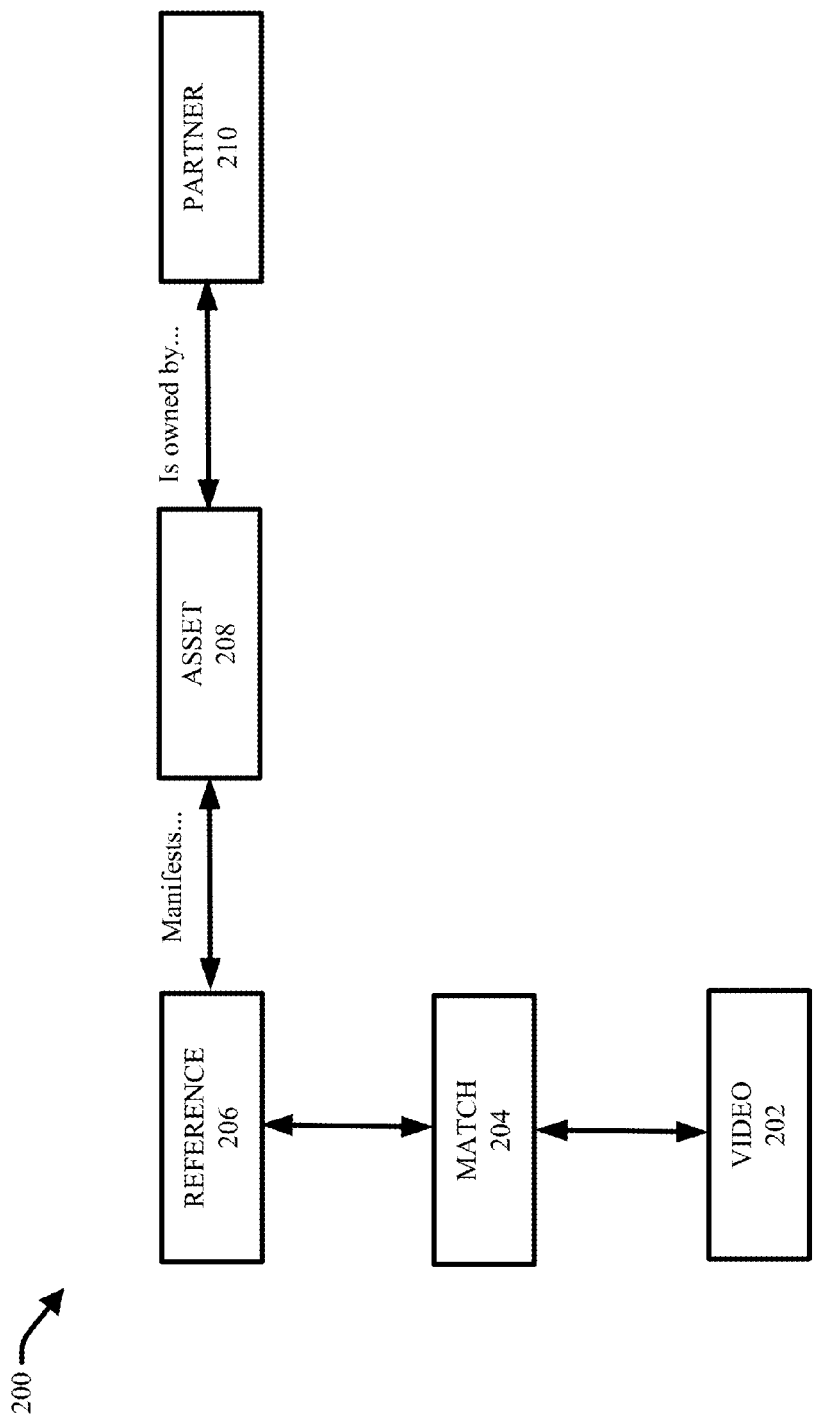
FIG. 2 presents a diagram that demonstrates the relationship between various components, objects, and players of media ranking systems and methods in accordance with various aspects and embodiments described herein.

FIG. 2 presents a diagram 200 that demonstrates the relationship between various components, objects, and players of media ranking systems and methods disclosed herein. These components, objects, and players include a video 202, a match, a reference 206, an asset 208 and a partner 210.

An asset 208 represents intellectual property associated with an entity based on ownership of some legal right (e.g., a copyright, a patent or a trademark) to the intellectual property. With respect to the subject disclosure, an asset generally includes a copyrighted media item (e.g., a video, audio, audio associated with a video, music, and etc.). An asset is owned by an entity (e.g., a copyright holder or assignee). As used herein, the holders or owners of assets are referred to as partners 210. For example, an entity could have the asset of the copyright to all media content, audio and video included and associated with motion picture ABC.

When a partner owns an asset, the partner can define policies regarding usage of the asset by others. For example, a partner can restrict publication of an asset, require payment for use of the asset, or require a user to allow the partner to monitor statistics regarding a user video that employs their asset. These three polices are referred to herein as a blocking policy, a monetization policy, and a tracking policy respectively. It should be appreciated that a partner can define any suitable type of policy parameters restricting/governing usage of their asset aside from those mentioned herein.

Reference 206 is a manifestation of an asset. For example, a reference can include an exact copy of an asset/copyrighted media item, a substantially same copy of an asset/copyrighted media item (e.g., a version of an asset/copyrighted media item with a different aspect ratio, different, encoding, different languages, different audio tracks, and etc.), or a portion of an asset/copyrighted media item (e.g., a snippet or frame of a video), an aspect of an asset/copyrighted media item (e.g., an audio component or a video component). In other words, a single asset can be associated with a plurality (e.g., two or more) of different references where each of the references represent the same asset. As used herein, a reference includes an AVR of a copyrighted media item or asset (and vice versa). Thus a copyrighted media item/asset can be associated with a plurality of authoritative versions (although typically it is around 0-1 authoritative versions per video). In an aspect, a reference 206 includes information that defines an asset/copyrighted media content. This information can include a copy of the reference or data that identifies (e.g., audio fingerprint, digital fingerprint, title information, author information, and etc.) the reference. Further to the above example, where the asset is the motion picture ABC, a reference 206 can include a media component of ABC (e.g., the audio only, the music from ABC, the video without audio, a frame from video ABC, a snippet of dialogue from video ABC, and etc), and/or the entire video ABC.

As a non-limiting example, a user video (V) is said to have an asset (A) with reference (R) associated with a watchable video (VR) as its authoritative version if a certain set of criteria are fulfilled. For example, the criteria could be: (1) at least 70% of the user video (V) matches some reference of the asset (A) on a video channel, or on both audio and video channels; (2) at least one reference (R) of the asset (A) is associated with a video (VR) that is watchable on a streaming website, at least in some location; (3) the video (VR) has an audio track in the same language as (V); and/or (4) the match between the user video (V) and the reference (R) gives rise to a monetize or track policy—a block policy would make authoritative version promotion moot. It is to be appreciated that not all of these criteria need to apply in every case, and other criteria can be enforced in lieu of or in addition to these. In general, the notion of an authoritative version of a user video is intended to capture the intuitive notion of content that contains the user video, and, in addition, has some kind of authority behind it.

Regardless of exactly how the definition is formulated, any well-formed definition gives rise to a small set (e.g., typically 0 or 1) of authoritative versions (called VR above) to each user video (V above).

A video 202 can include any suitable type and length of video. In an aspect, a video 202 can include a user video that has been provided to a media sharing system for the purpose of publication. For example, a video 202 can include a homemade family video with background music dubbed thereto. In another example, a video can include a video copy of a mainstream television show, commercial, or public performance. Videos 202 that will become associated with ranking information in accordance with systems and methods disclosed herein will include at least some copyrighted media content associated with a monetization policy and/or a tracking policy.

Match 204 includes the media content included in a video 202 that is the same or substantially the same as a reference 206. A match can constitute part of the media content of a user video (e.g., the user video includes some copyrighted reference material and some original content) or substantially all content of a user video (e.g., the user video is a version/copy a single reference). Further, a match can include audio content and/or video content of a user video. For example, a user may create a video that is a mash up of copyrighted videos, copyrighted audio and original content. According to this example, a match can include the media content in the user video that is identified as copyrighted video or audio where the copyrighted video or audio is defined as a reference 206. In another example, a user may create a copied version of a copyrighted video that is provided as a reference (e.g., a recorded television clip or concert presentation). The user video version 202 of the copyrighted video (e.g., the version of the authoritative version of the video) could be substantially the same as the copyrighted video with some variation to the user video version 202 (e.g., different encoding parameters, different metadata encryption, different quality, different resolution, camera angle, and etc.). According to this example, a match can include content of a user video 202 that is a version of an original copyrighted video (e.g., the authoritative version) but not the identical original copyrighted video defined by a reference 206.

Figure 3:
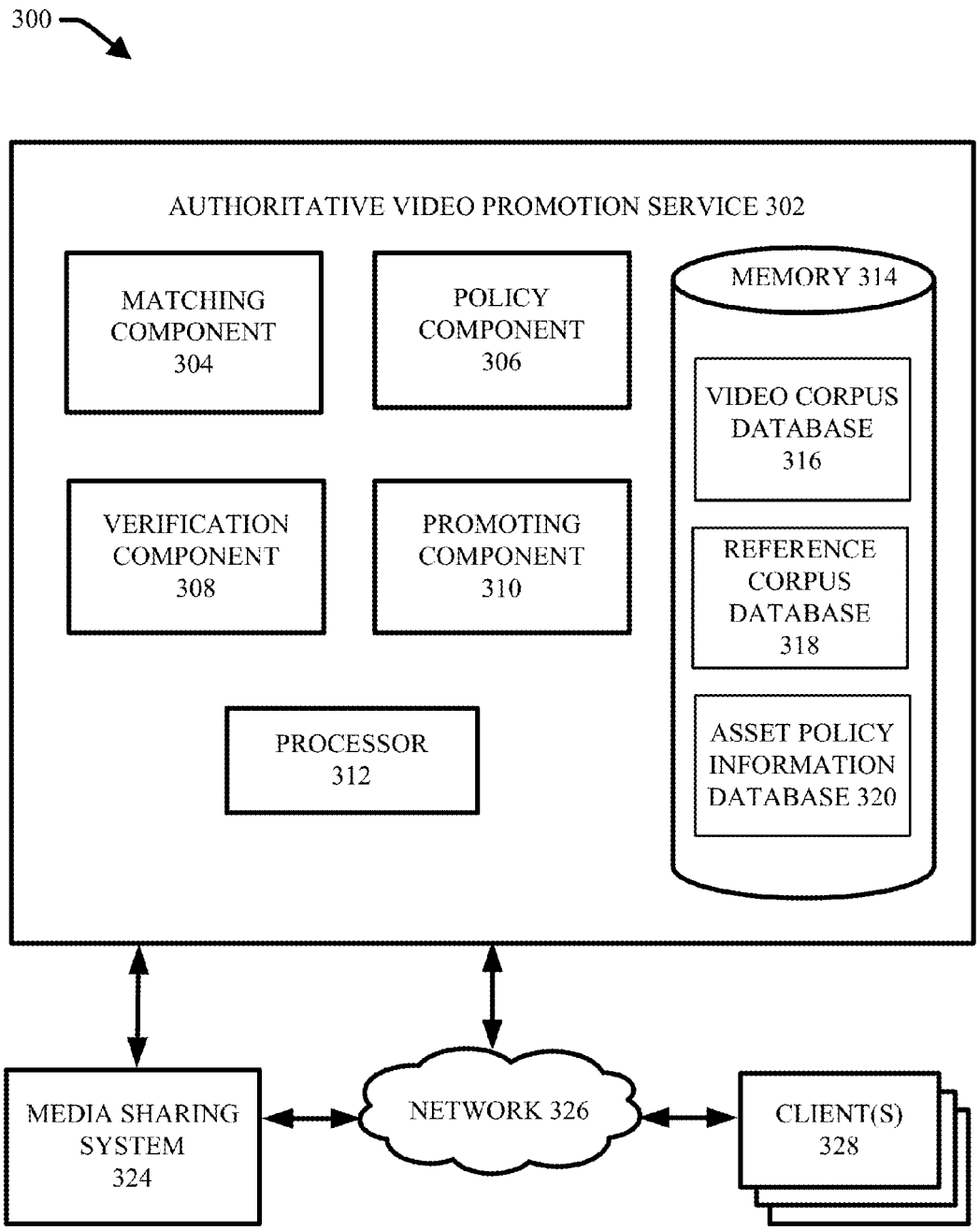
FIG. 3 presents an example system for promoting an original version of a copyrighted media item over an authorized copied version of the copyrighted media item in connection with a search query in accordance with various aspects and embodiments described herein.

Referring now to FIG. 3, presented is an example system 300 configured to facilitate relative ordering of videos in a search query based in part on policies governing usage of copyrighted content included in the videos. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 300 includes authoritative video promotion service 302, media sharing system 324, network 326 and one or more clients 328. Authoritative video promotion service 302 can include memory 314 for storing computer executable components and instructions. Authoritative video promotion service 302 can further include a processor 312 to facilitate operation of the instructions (e.g., computer executable components and instructions) by the authoritative video promotion service 302. Memory 314 can further include video corpus database 316 that stores one or more uploaded user videos. In an aspect, the user videos in video corpus database 316 include uploaded user videos that are available for sharing/viewing at one or more clients 328 by a media sharing system 324 via a network 326.

For example, a client 328 can access media sharing system 324 via a network 326 to upload videos to the media sharing system 324 and to receive videos (e.g., as streamed or downloaded to the client 328) from the media sharing system 324. The media sharing system 324 can store videos available to clients 328, including uploaded user videos, in a data store accessible to the media sharing system 324. In an aspect, this database includes video corpus database 316. For example, media sharing system 324 can access video corpus database 316 located at the video promotion service 302 either directly or via a network 326. In another aspect, one or more of the components of video promotion service, including video corpus database, can be located at the media sharing system 324.

Memory 314 can also include reference corpus database 318 that stores reference files for assets (e.g. copyrighted media items owned by partners). As noted supra, such reference files can include information (e.g., copies, versions, components) representative of respective assets/copyrighted media items. Memory 314 can further include asset policy information database 320 that includes policy information for respective assets associated with reference files in reference corpus database. Policy information can define requirements for usage of the respective assets in a user video.

It should be appreciated that although reference corpus database 318 and asset policy information database 320 are depicted as separate databases, the information of both databases can be joined in a single database. Further one or more components of memory (databases 316-320) can be externally located from video information database and accessed by video information database via a network (e.g., network 326).

Authoritative video promotion service 302 can further include matching component 304, policy component 306, verification component 308, and promoting component 310. Matching component 304 is configured to identify copyrighted media content included in a video, wherein the copyrighted media content is associated with an asset publication/usage policy (e.g., stored in asset policy information database 320). In particular, the matching component 304 is configured to compare an uploaded user video with the various references in reference corpus database 318 to identify matches between the user video and one or more reference files. If the matching component 304 identifies a match between a user video and a reference file, the matching component 304 then identifies the asset represented by the reference file. For example, the reference corpus database 318 can include a look up table that defines an asset and one or more reference files for the asset. In an aspect, the user video is a video stored in video corpus database 316. In another aspect, the user video is a video uploaded to media sharing system 324 or otherwise provided by to video promotion service 302 by a client 328 via a network 326. Policy component 306 is configured to examine policy information for an asset that is identified by matching component 304 as being included in a user video. For example, policy component 306 can examine an asset publication/usage policy defined in asset information database 320 and determine various policy requirements associated with usage of the asset in a user video.

Verification component 308 is configured to authorize publication of a user video having copyrighted material therein. Copyright owners may have various motivations for allowing users to employ their copyrighted media content/ asset in user videos (e.g., monetization motivations and/or tracking motivations). Asset owners can define policy information that indicates various requirements for authorizing usage of an asset in a user video. In an aspect, asset policy information can be stored in memory 314 in asset policy information database 320. For example, a policy associated with an asset can authorize usage of the asset in a user video in exchange for a fee or an agreement to receive tracking information regarding user interaction with the user video. In addition, owners of the copyrighted material may further desire to police the manner in which the copyrighted material is used in association with a user video. For example, the copyright owner may not want to promote a poor quality version of their copyrighted content or user video that tarnishes the integrity of their copyrighted media content. Accordingly, a policy associated with an asset, as defined by the asset owner, can further define various additional restrictions associated with usage of the asset.

Verification component 308 is configured to verify that policy requirements are met by a user video employing an asset prior to publication of the user video with the copyrighted material of the asset therein. For example, the verification component 308 can request payment for a monetization policy associated with an asset or initiate tracking of user interaction with a user video in association with a tracking policy. Further, where an asset usage policy indicates that a user video cannot include the copyrighted content of the asset, the verification component 308 can prevent or block the user video from being published. For example, the verification component 308 can instruct the promoting component 310 to associate search information with the user video that causes the user video to be blocked from appearing in a search result. As used herein, the term authorized user video or authorized version user video refers to a video that includes copyrighted media content representative of an asset (e.g., as represented by a reference file matched to the video) that has been authorized for use based on an asset policy defined by the asset holder. In other words, an authorized user video includes a video that has not been blocked for publication based on the copyrighted content included therein.

As the number of authorized user videos that include copyrighted content of an AVR increase, the AVR can become lost in the midst of user videos associated with it. As a result, the AVR may be outshined by user videos including content of the AVR in search query where the shared copyrighted media content (e.g., the copyright content of the AVR and the authorized user videos) is relevant. Thus for a given search query, authoritative video promotion service 300 can promote an authoritative version of an original copyrighted media item (e.g., the AVR) over authorized non-authoritative versions relative to relevancy of the original copyrighted item for a given search query. More particularly, to the extent an original copyrighted item is relevant for a given search query the authoritative version will be promoted above non-authoritative versions. In other words, if the original copyrighted content is not as relevant to a search query as compared to other content of a user video, the user video may be promoted over the AVR with respect to the particular search query.

In another example, for a particular search query that seeks content where content A and content B (A and B are respectively authored by different sources) are highly relevant to the search query, an AVR associated with content A would be promoted over user videos that include direct or partial copies of A. Likewise, an AVR associated with content B would be promoted over user videos that include direct or partial copies of B. However, a user video that includes direct or partial copies of both A and B would be ranked relatively higher than AVR(A) and AVR(B) for the given search query since the combination of content A and B would be more relevant to the search query than A or B in isolation.

In an aspect, in addition to promoting an AVR over user videos including copyrighted content of the AVR in a search query where the shared copyrighted content is highly relevant to the search query, video promotion service 302 can promote the user videos including the copyrighted content of the AVR to various degrees with respect to the search query based in part on factors related to the shared copyrighted content. For example, video promotion service 302 can be configured to promote all authorized user videos (e.g., videos that qualify for authorization based on policy information defined by the asset owner) in an equal manner with respect to the copyright content included therein. However, in another aspect, video promotion service 302 can be configured to promote authorized user videos to varying degrees based on various parameters defined by video promotion service 302.

For example, video promotion service 302 can be configured to promote authorized user videos that include copyrighted content and integrate the copyrighted content in an "acceptable manner," (where the qualifications for "acceptable manner" are defined by the video promotion service). In another example, video promotion service 302 can be configured to promote authorized user videos based on type of copyrighted content included therein (e.g., video, audio, video+audio), ratio of copyrighted content with respect to non-copyrighted content, quality of the copyrighted content, and/or number of different assets represented by the copyrighted content (e.g., where the user video is a mash up of various different assets). In another example, video promotion service can be configured to promote user videos that include copyrighted content of an AVR yet differ substantially from the AVR. In yet another example, video promotion service 302 can be configured to promote authorized user videos that attempt to replicate an original copyrighted video in a manner most akin to the original.

In order to facilitate promoting AVRs for the reasons discussed above, authoritative video promotion service 302 includes a promoting component 310. Promoting component 310 is configured to promote, in connection with a search query, an authoritative version (AVR) of copyrighted media content over one or more non-authoritative versions of the copyrighted media content (e.g., the authorized user videos including the copyrighted media content) relative to relevancy of the copyrighted media content to the search query. In an aspect, promoting component 310 can apply an algorithm that gives an AVR greater ranking order seniority in a search query compared to non-authoritative user video versions of the AVR with respect to relevance of the shared copyrighted content of the AVR and the non-authoritative versions to a particular search query. For example, the promoting component 310 can associate a specific AVR search signal to an AVR related to the copyrighted content of the AVR. The AVR search signal can affect position or ordering of the AVR with respect to other user videos including copyrighted content of the AVR in a search query relative to relevancy of the common copyrighted media content to the search query.

In another example, promoting component 310 can assign scores to videos included in a search query result that control the order in which the videos should appear in the search query result as a function of relevance to the search query.

When the videos in the search query include an authoritative version of a video (R) and one or more non-authoritative versions (V) of the video (R), the promoting component 310 can adjust the score of (R) so that it is pushed forward/higher in the search query results, preferably higher than the one or more non-authoritative versions (V).

According to this example, where videos in a search query result have the following numerical scores and order, X99 X90 X88 V44 X40 R33, (where V represents a non-authoritative version of R and X represents other videos), in order to promote R over V, the promoting component 310 can apply a multiplier rule whereby the score of R is multiplied by 1.5. As a result, the score of R would become R49 and the search result list order would appear as X99 X90 X88 R49 V44 X40. In another aspect, the promoting component 310 could apply a rule whereby a deduction of 10 is taken from the score of V and added to the score of R. As a result, the score of R would become R43 and the search result list order would appear as X99 X90 X88 R43 X40 V43. In yet another aspect, the promoting component 310 could apply a rule whereby a deduction of 5 is taken from the score of V and added to the score of R. Accordingly, the score of R would become R38 and the search result list order would appear as X99 X90 X88 X40 V39 R38.

It should be appreciated that the above techniques for effecting the promotion of R over V are merely exemplary. For example, search ranking by promotion component 310 can employ more sophisticated and complex algorithms than the above scoring manipulation examples. For example, promoting component 310 can work with thresholds and multipliers to modify relative "rankings" (i.e., scores) of R and V relative to the search query. AVR promotion search signals can be one among many search (or ranking) signals associated with rendering videos in query result. Other signals could be the similarity of the video title with the search query, the similarity of the video with other material liked by the user, etc.

The promoting component 310 can further be configured to promote user videos that include copyrighted content of an AVR to various degrees in a search query with respect to various features associated with inclusion of the copyrighted content therein. In an aspect, the promoting component 310 can associate such user videos with search signals that cause the user videos to fall below the AVR in a search query with respect to relevancy. The search signals can further influence a manner and frequency in which user videos including copyrighted content of the AVR are rendered in a search result with respect to the AVR and one another.

In an aspect, promoting component 310 is configured to determine a search signal for a user video including copyrighted content of an AVR (e.g., a user video including one or more references of the AVR) based on authorization of usage of the copyrighted content (e.g., as determined by verification component 308) and at least the publication policy associated with the copyrighted media content/asset content included in the user video (e.g., determine a ranking based on whether the policy is a monetization policy and/or a tracking policy). In another aspect, the search signal can reflect factors defined in a partner's asset usage policy including type of consideration required for usage (e.g., type of publication policy such as a monetization policy or a tracking policy) and/or degree of consideration (e.g., amount of money required for a monetization policy or amount of tracking information agreed to, and etc.). The search signal can also reflect factors including but not limited to: the type of matched reference file or component in the user video as compared to the asset represented by the reference file or component (e.g., video with audio reference component, video reference component without audio, or audio reference component), the number of other published user videos including the copyrighted material of the matched reference file or component, the language of the copyrighted media content of the user video (e.g., in audio or subtitles) as compared to the language of the media content of the asset, the amount of copyrighted material included in the user video with respect to non-copyrighted material, the number of different assets associated with the copyrighted material (e.g., where the user video is a mash-up of different copyrighted assets), the manner of incorporation of the copyrighted material, the quality of the user video, and design and encoding parameters of the user video.

The search signal(s) assigned to an authorized user video can depend on goals of video promotion service 302, which can vary. For example, video promotion service 302 can be designed to promote user videos that are highly similar to an original AVR or to promote user videos that vary significantly from the AVR. In another example, video promotion service 302 can be configured to assign a higher search signal (where higher ranking information promotes a video to appear at the top of a search result list) to user videos that include copyrighted content and where the user has paid a higher fee for use of the copyrighted content. Still in yet another example, the video promotion service 302 can be configured to promote user videos that include copyrighted content and where the copyrighted content is video+audio as compared to video alone or audio alone.

Although promoting component 310 can associate AVR promotion search signals with an AVR that and/or user videos including copyrighted content of the AVR that results in the promotion of the AVR over one or more of the user videos in a search query, it should be appreciated that such search signals can be employed as one of a plurality of parameters by a search algorithm when generating a search result. The AVR search signals merely serve to promote AVRs over (authorized) non-authoritative versions of the AVRs (e.g., user videos employing copyrighted content of the AVRs) as a function of relevancy of the shared copyrighted content with respect to a given search query. In particular, AVR search signals, as described herein, alone will not solely govern the order in which videos appear in a search result. For example, in some cases, a user generated copy or version of an AVR can appear before the AVR in a search result where the user generated copy better satisfies search criteria with respect to other parameters not related to the shared copyright material.

Referring back to FIG. 3, system 300 further includes media sharing system 324, a network 326 and one or more clients 328. In an aspect, the media sharing system 324 is configured to provide videos, including user videos stored in video corpus database 316 to one or more clients 328 over a network 326. Client 328 can include any suitable computing device associated with a user and configured to interact with video promotion service 302 and/or a media sharing system 324. For example, a client device 328 can include a desktop computer, a laptop computer, a smart-phone, a tablet personal computer (PC), or a PDA. As used in this disclosure, the terms "content consumer" or "user" refers to a person, entity, system, or combination thereof that employs system 300 (or additional systems described in this disclosure). In various aspects, a user employs video promotion service 302 and/or media sharing system 324 via a client device 328

In an aspect, one or more components of system 300 are configured to interact via a network 326. For example, in one embodiment, a client device 328 is configured to access video promotion service 302 and/or an external media sharing system 324 via network 326. Network 326 can include but is not limited to a cellular network, a wide area network (WAD, e.g., the Internet), a local area network (LAN), or a personal area network (PAN). For example, a client 328 can communicate with a media sharing system 324 and/or authoritative video promotion service 302 (and vice versa) using virtually any suitable wired or wireless technology, including, for example, cellular, WAN, wireless fidelity (Wi-Fi), Wi-Max, WLAN, and etc. In an aspect, one or more components of system 300 are configured to interact via disparate networks. For example, client 328 can receive media from media sharing system 324 over a LAN while video promotion service 302 can communicate with a media sharing system 324 over a WAN.

In an embodiment, video promotion service 302, media sharing system 324 and the one or more clients 328 are disparate computing entities that are part of a distributed computing infrastructure. According to this embodiment, media sharing system 324 and/or clients 328 can employ video promotion service 302 via a network 326. For example, video promotion service 302 can access a media provider via network 326, analyze videos uploaded to media sharing system 324 over the network 324 and store uploaded videos in video corpus database 316. In another embodiment, the video promotion service 302 and the media sharing system 324 can be combined into a single computing entity. For example, the media sharing system could include a video promotion service 302 and thus interact directly.

Figure 4:
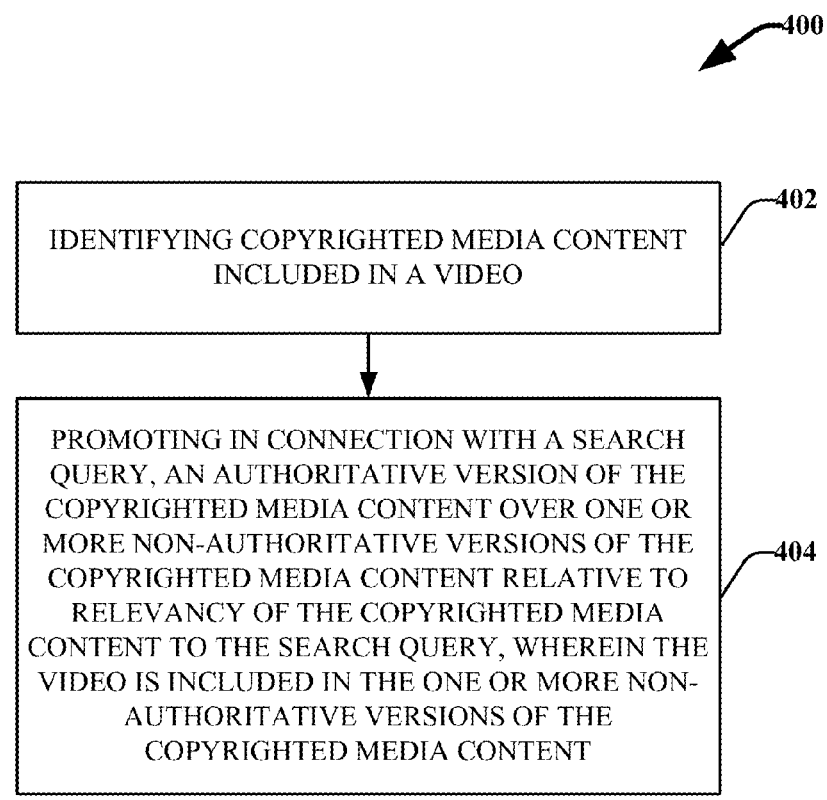
FIG. 4 is a flow diagram of an example method for promoting an original version of a copyrighted media item over an authorized copied version of the copyrighted media item in connection with a search query in accordance with various aspects and embodiments described herein.

FIG. 4 illustrates a flow chart of an example method 400 for promoting an authoritative version (AVR) of copyrighted media content over one or more non-authoritative versions of the copyrighted media content relative to relevancy of the copyrighted media content to a search query. At 402, copyrighted media content included in a video is identified (e.g., using matching component 304). At 404, in connection with a search query, an authoritative version of the copyrighted media content is promoted over one or more non-authoritative versions of the copyrighted media content relative to relevancy of the copyrighted media content to the search query, wherein the video is included in the one or more non-authoritative versions of the copyrighted media content (e.g., using promoting component 310).

Figure 5:
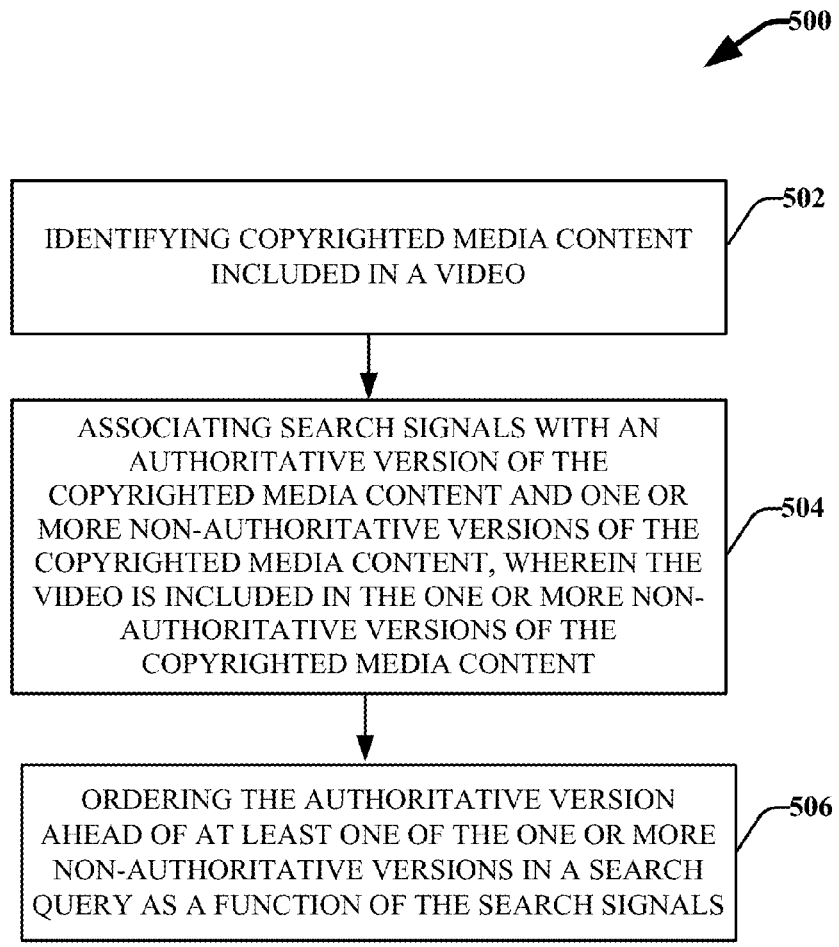
FIG. 5 is a flow diagram of another example method for promoting an original version of a copyrighted media item over an authorized copied version of the copyrighted media item in connection with a search query in accordance with various aspects and embodiments described herein.
Figure 6:
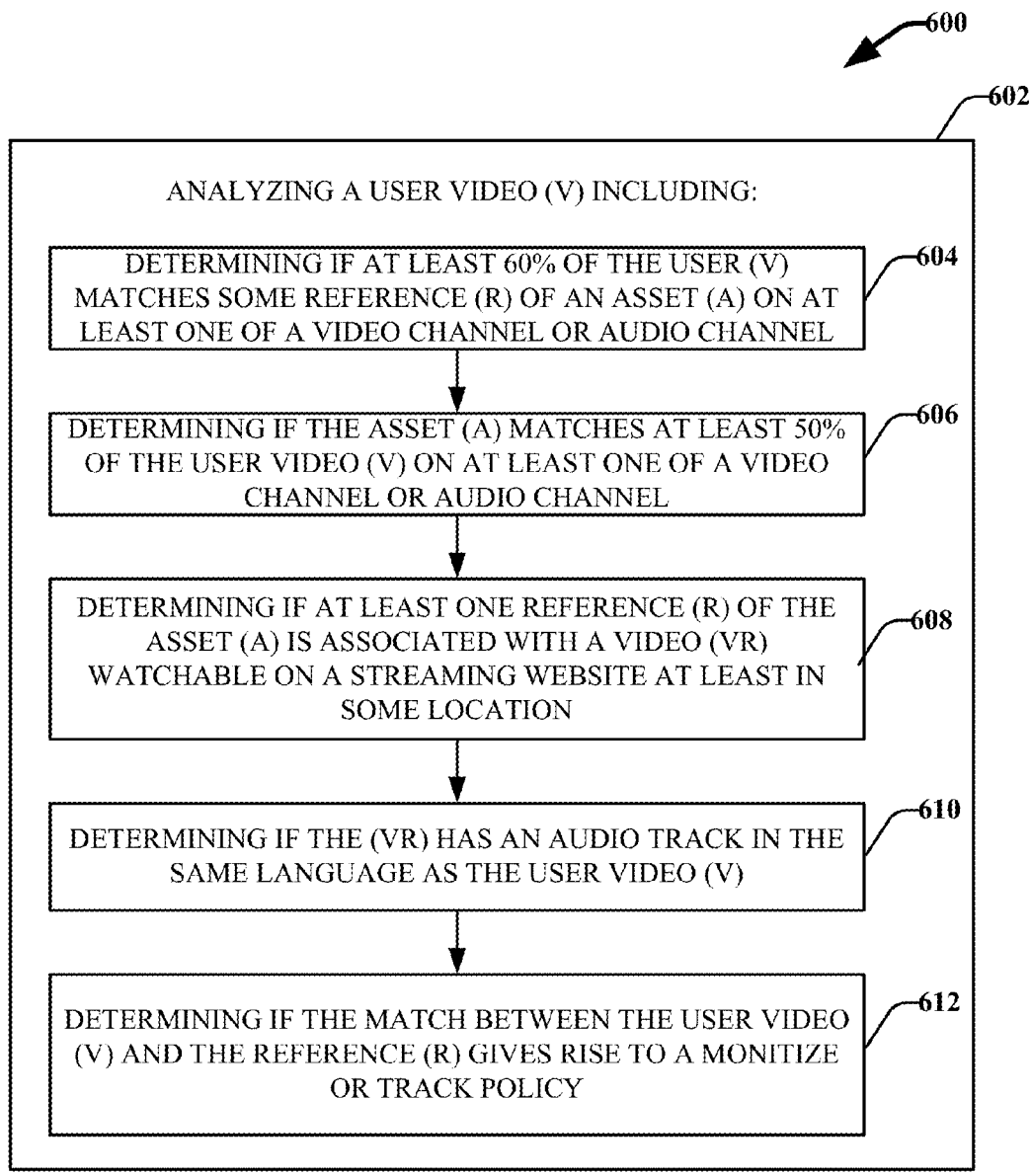
FIG. 6 is a flow diagram of another example method for determining whether a user video is associated with an authoritative version in accordance with various aspects and embodiments described herein.

FIG. 5 illustrates a flow chart of another example method 500 for promoting an authoritative version (AVR) of copyrighted media content over one or more non-authoritative versions of the copyrighted media content relative to relevancy of the copyrighted media content to a search query. At 502, copyrighted media content included in a video is identified (e.g., using matching component 304). At 504, search signals are associated with an authoritative version of the copyrighted media content and one or more non-authoritative versions of the copyrighted media content, wherein the video is included in the one or more non-authoritative versions of the copyrighted media content (e.g., using promoting component 310). At 506 the authoritative version is ordered ahead of at least one of the one or more non-authoritative versions in a search query as a function of the search signals FIG. 6 illustrates a flow chart of an example method 600 for determining whether a user video (V) is said to have an asset (A) with reference (R) associated with a watchable video (VR) as its authoritative version (AVR). As noted supra, an (R) is a manifestation of an asset (R) and an asset (A) can be associated with one or more references (R). The method can include analyzing the user video (V) 602 in one or more of the following manners including: 604, determining if at least 60% of the user video (V) matches some reference of the asset (A) on a video channel, or on both audio and video channels; 606, determining if the asset (A) matches at least 50% of the user video (V) on at least one of a video or audio channel); 608, determining if at least one reference (R) of the asset (A) is associated with a video (VR) that is watchable on a streaming website, at least in some location; 610, determining if the video (VR) has an audio track in the same language as (V); and 612, determining if the match between the user video (V) and the reference (R) gives rise to a monetize or track policy—a block policy would make authoritative version promotion moot. It is to be appreciated that not all of these criteria need to apply in every case, and other criteria can be enforced in lieu of or in addition to these.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 7:
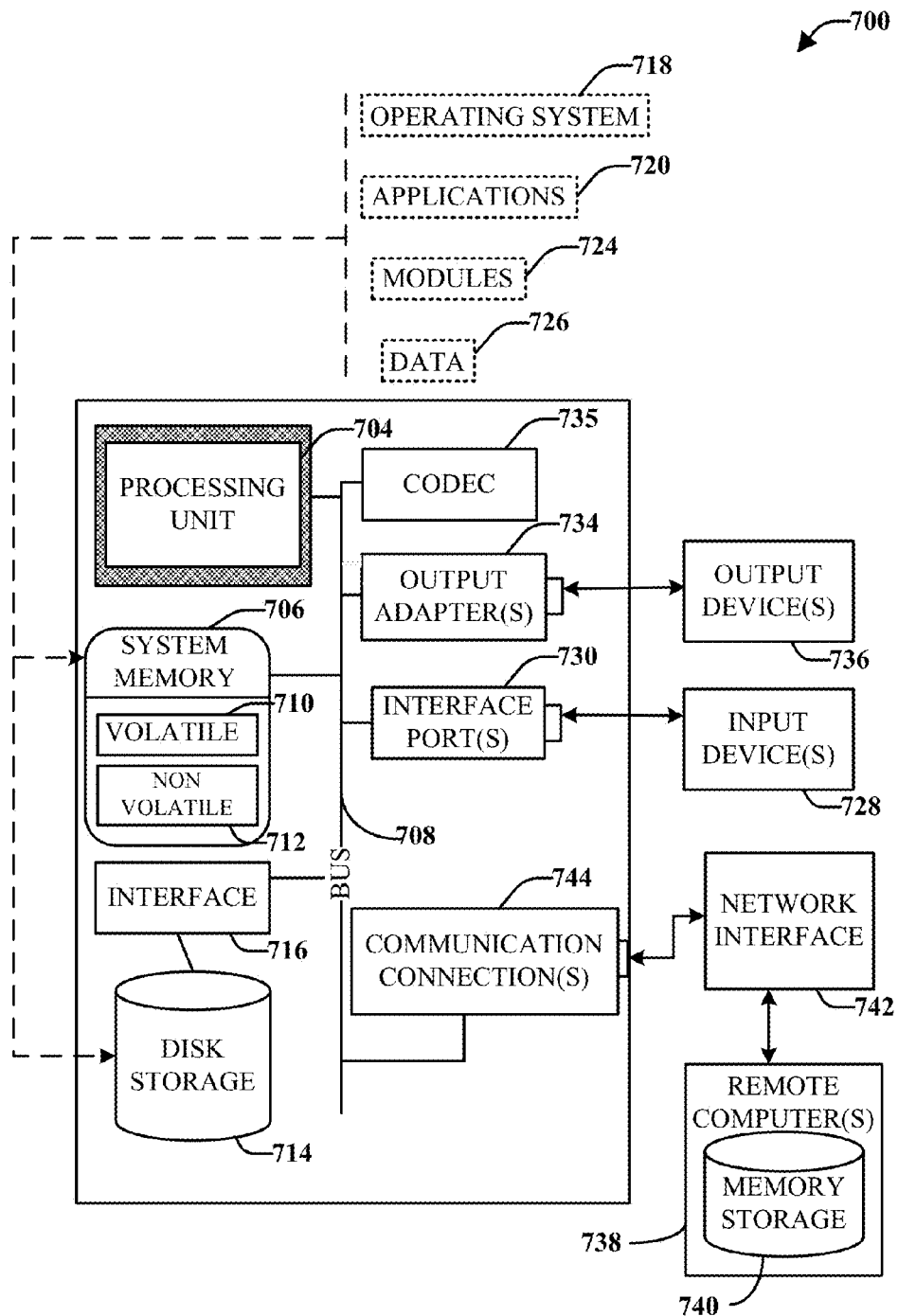
FIG. 7 is a schematic block diagram illustrating a suitable operating environment in accordance with various aspects and embodiments.

With reference to FIG. 7, a suitable environment 700 for implementing various aspects of the claimed subject matter includes a computer 702. The computer 702 includes a processing unit 704, a system memory 706, a codec 705, and a system bus 708. The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 706 includes volatile memory 710 and non-volatile memory 712. The basic input/output system (BIOS), containing the basic routines to transfer information between elements within the computer 702, such as during start-up, is stored in non-volatile memory 712. In addition, according to present innovations, codec 705 may include at least one of an encoder or decoder, wherein the at least one of an encoder or decoder may consist of hardware, a combination of hardware and software, or software. Although, codec 705 is depicted as a separate component, codec 705 may be contained within non-volatile memory 712. By way of illustration, and not limitation, non-volatile memory 712 can include read only memory (ROM), programmable ROM (PROM), electrically programmable ROM (EPROM), electrically erasable programmable ROM (EEPROM), or flash memory. Volatile memory 710 includes random access memory (RAM), which acts as external cache memory. According to present aspects, the volatile memory may store the write operation retry logic (not shown in FIG. 7) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 702 may also include removable/non-removable, volatile/non-volatile computer storage medium. FIG. 7 illustrates, for example, disk storage 714. Disk storage 714 includes, but is not limited to, devices like a magnetic disk drive, solid state disk (SSD) floppy disk drive, tape drive, Jaz drive, Zip drive, LS-70 drive, flash memory card, or memory stick. In addition, disk storage 714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface is typically used, such as interface 716.

It is to be appreciated that FIG. 7 describes software that acts as an intermediary between users and the basic computer resources described in the suitable operating environment 700. Such software includes an operating system 718718. Operating system 718718, which can be stored on disk storage 714, acts to control and allocate resources of the computer system 702. Applications 720 take advantage of the management of resources by operating system 718718 through program modules 724, and program data 726, such as the boot/shutdown transaction table and the like, stored either in system memory 706 or on disk storage 714. It is to be appreciated that the claimed subject matter can be implemented with various operating systems or combinations of operating systems.

A user enters commands or information into the computer 702 through input device(s) 728. Input devices 728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 704 through the system bus 708 via interface port(s) 730. Interface port(s) 730 include, for example, a serial port, a parallel port, a game port, and a universal serial bus (USB). Output device(s) 736 use some of the same type of ports as input device(s). Thus, for example, a USB port may be used to provide input to computer 702, and to output information from computer 702 to an output device 736. Output adapter 734 is provided to illustrate that there are some output devices 736 like monitors, speakers, and printers, among other output devices 736, which require special adapters. The output adapters 734 include, by way of illustration and not limitation, video and sound cards that provide a means of connection between the output device 736 and the system bus 708. It should be noted that other devices and/or systems of devices provide both input and output capabilities such as remote computer(s) 738.

Computer 702 can operate in a networked environment using logical connections to one or more remote computers, such as remote computer(s) 738. The remote computer(s) 738 can be a personal computer, a server, a router, a network PC, a workstation, a microprocessor based appliance, a peer device, a smart phone, a tablet, or other network node, and typically includes many of the elements described relative to computer 702. For purposes of brevity, only a memory storage device 740 is illustrated with remote computer(s) 738. Remote computer(s) 738 is logically connected to computer 702 through a network interface 742 and then connected via communication connection(s) 744. Network interface 742 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 744 refers to the hardware/software employed to connect the network interface 742 to the bus 708. While communication connection 744 is shown for illustrative clarity inside computer 702, it can also be external to computer 702. The hardware/software necessary for connection to the network interface 742 includes, for exemplary purposes only, internal and external technologies such as, modems including regular telephone grade modems, cable modems and DSL modems, ISDN adapters, and wired and wireless Ethernet cards, hubs, and routers.

Figure 8:
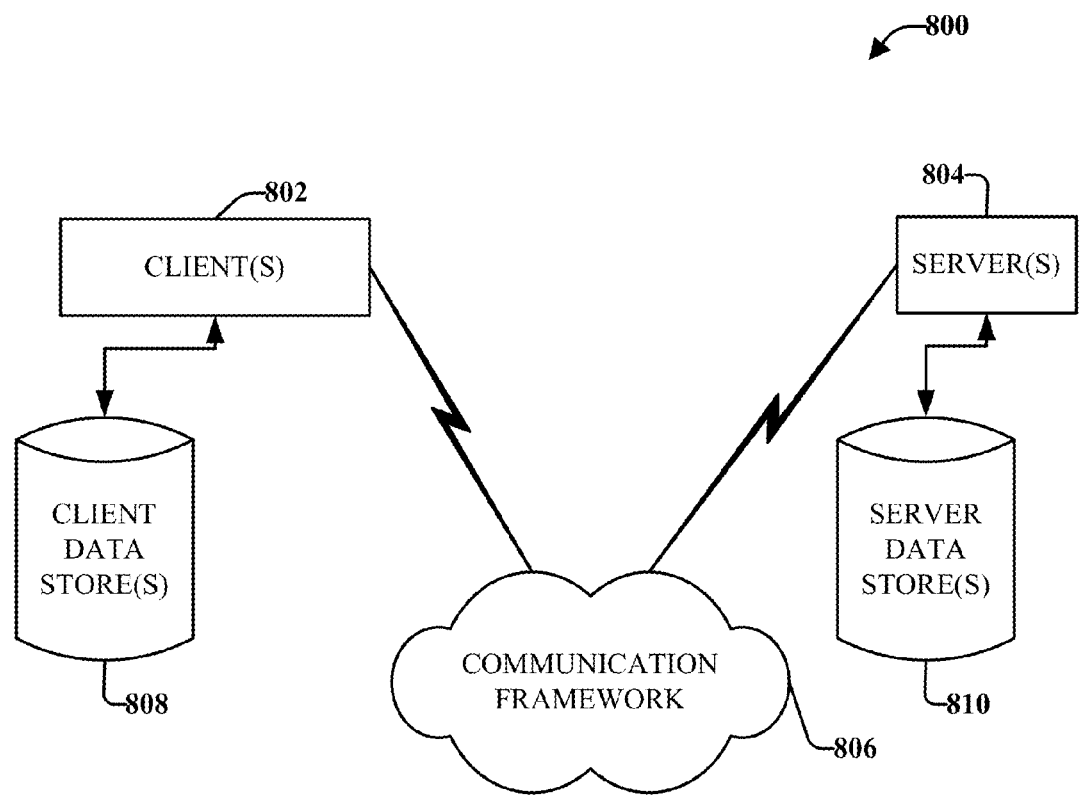
FIG. 8 is a schematic block diagram of a sample-computing environment in accordance with various aspects and embodiments.

Referring now to FIG. 8, there is illustrated a schematic block diagram of a computing environment 800 in accordance with this disclosure. The system 800 includes one or more client(s) 802 (e.g., laptops, smart phones, PDAs, media players, computers, portable electronic devices, tablets, and the like). The client(s) 802 can be hardware and/or software (e.g., threads, processes, computing devices). The system 800 also includes one or more server(s) 804. The server(s) 804 can also be hardware or hardware in combination with software (e.g., threads, processes, computing devices). The servers 804 can house threads to perform transformations by employing aspects of this disclosure, for example. One possible communication between a client 802 and a server 804 can be in the form of a data packet transmitted between two or more computer processes wherein the data packet may include video data. The data packet can include a metadata, e.g., associated contextual information, for example. The system 800 includes a communication framework 806 (e.g., a global communication network such as the Internet, or mobile network(s)) that can be employed to facilitate communications between the client(s) 802 and the server(s) 804.

Communications can be facilitated via a wired (including optical fiber) and/or wireless technology. The client(s) 802 include or are operatively connected to one or more client data store(s) 808 that can be employed to store information local to the client(s) 802 (e.g., associated contextual information). Similarly, the server(s) 804 are operatively include or are operatively connected to one or more server data store(s) 810 that can be employed to store information local to the servers 804.

In one embodiment, a client 802 can transfer an encoded file, in accordance with the disclosed subject matter, to server 804. Server 804 can store the file, decode the file, or transmit the file to another client 802. It is to be appreciated, that a client 802 can also transfer uncompressed file to a server 804 and server 804 can compress the file in accordance with the disclosed subject matter. Likewise, server 804 can encode video information and transmit the information via communication framework 806 to one or more clients 802.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a memory having stored thereon computer executable instructions; and
   a processor that executes the computer executable instructions to perform steps comprising:
      storing a first media item that includes an original version of copyrighted media content;
      storing a second media item that includes a copy of the copyrighted media content;
      receiving a search query from a client device;
      responsive to receiving the search query, identifying the first media item and the second media to include in search results for the search query;
      responsive to identifying the first media item and the second media item, determining, based on information associated with the first media item and information associated with the second media item, that the first media item includes the original version of the copyrighted media content and that the second media item includes the copy of the copyrighted media content;
      ranking the first media item over the second media item in the search results based on the first media item including the original version of the copyrighted media content and the second media item including the copy of the copyrighted media content; and
      transmitting the search results to the client device, the first media item and the second media item displayed in the search results according to the ranking.

2. The system of claim 1, wherein the first media item is ranked in the search results based on relevancy of the first media item to the search query.

3. The system of claim 1, wherein the processor further performs steps comprising:
   verifying copyright authorization associated with the second media item including the copy of the copyrighted media content.

4. The system of claim 1, wherein the processor further performs steps comprising:
   determining the first media item comprises an original version of the copyrighted media content in response to at least 70% of the media item matching a reference of an asset associated with the copyrighted media content.

5. The system of claim 4, wherein the reference of the asset is associated with a video that is watchable on a streaming website.

6. The system of claim 1, the processor further performs steps comprising:
   identifying a third media item that includes a copy of the copyrighted media content;
   determining that the third media item is not authorized to include the copy of the copyrighted media content; and
   responsive to determining that the third media item is not authorized to include the copy of the copyrighted media content, preventing publication of the third media item.

7. The system of claim 1, wherein the ranking of the first media item and the second media item is determined based on a number of additional media items available for public viewing that include the copyrighted media content.

8. The system of claim 1, wherein the first media item and the second media item are videos accessible by users.

9. A method comprising:
   storing, by a computer system, a first media item that includes an original version of copyrighted media content;
   storing, by the computer system, a second media item that includes a copy of the copyrighted media content;
   receiving, by the computer system, a search query from a client device;
   responsive to receiving the search query, identifying, by the computer system, the first media item and the second media to include in search results for the search query;
   responsive to identifying the first media item and the second media item, determining, by the computer system based on information associated with the first media item and information associated with the second media item, that the first media item includes the original version of the copyrighted media content and that the second media item includes the copy of the copyrighted media content;
   ranking, by the computer system, the first media item over the second media item in the search results based on the first media item including the original version of the copyrighted media content and the second media item including the copy of the copyrighted media content; and
   transmitting, by the computer system, the search results to the client device, the first media item and the second media item displayed in the search results according to the ranking.

10. The method of claim 9, wherein the first media item is ranked in the search results based on relevancy of the first media item to the search query.

11. The method of claim 9, further comprising:
verifying copyright authorization associated with the second media item including the copy of the copyrighted media content.

12. The method of claim 9, wherein ranking the first media item over the second media item comprises:
assigning a first score to the first media item based on relevance of the first media item to the search query;
assigning a second score to the second media item based on relevance of the second media item to the search query;
increasing the first score based on the first media item including the original version of the copyrighted media content; and
ranking the first media item over the second media item in the search results based on the first score and the second score.

13. The method of claim 12, wherein increasing the first score comprises:
deducting a number of points from the second score based on the second media item including the copy of the copyrighted media content; and
increasing the first score by the number of points based on the first media item including the original version of the copyrighted media content.

14. The method of claim 12, wherein increasing the first score comprises:
multiplying the first score by a set number based on the first media item including the original version of the copyrighted media content.

15. The method of claim 9, wherein ranking the first media item over the second media item comprises:
assigning a first score to the first media item based on relevance of the first media item to the search query;
assigning a second score to the second media item based on relevance of the second media item to the search query;
decreasing the second score based on the second media item including the copy of the copyrighted media content; and
ranking the first media item over the second media item in the search results based on the first score and the second score.

16. A tangible non-transitory computer-readable storage medium comprising computer-readable instructions that, in response to execution, cause a computer system to perform operations, comprising:
storing, by the computer system, a first media item that includes an original version of copyrighted media content;
storing, by the computer system, a second media item that includes a copy of the copyrighted media content;
receiving, by the computer system, a search query from a client device;
responsive to receiving the search query, identifying, by the computer system, the first media item and the second media to include in search results for the search query;
responsive to identifying the first media item and the second media item, determining, by the computer system based on information associated with the first media item and information associated with the second media item, that the first media item includes the original version of the copyrighted media content and that the second media item includes the copy of the copyrighted media content;
ranking, by the computer system, the first media item over the second media item in the search results based on the first media item including the original version of the copyrighted media content and the second media item including the copy of the copyrighted media content; and
transmitting, by the computer system, the search results to the client device, the first media item and the second media item displayed in the search results according to the ranking.

17. The non-transitory computer readable medium of claim 16, wherein the first media item is ranked in the search results based on relevancy of the first media item to the search query.

* * * * *